Figure 1:
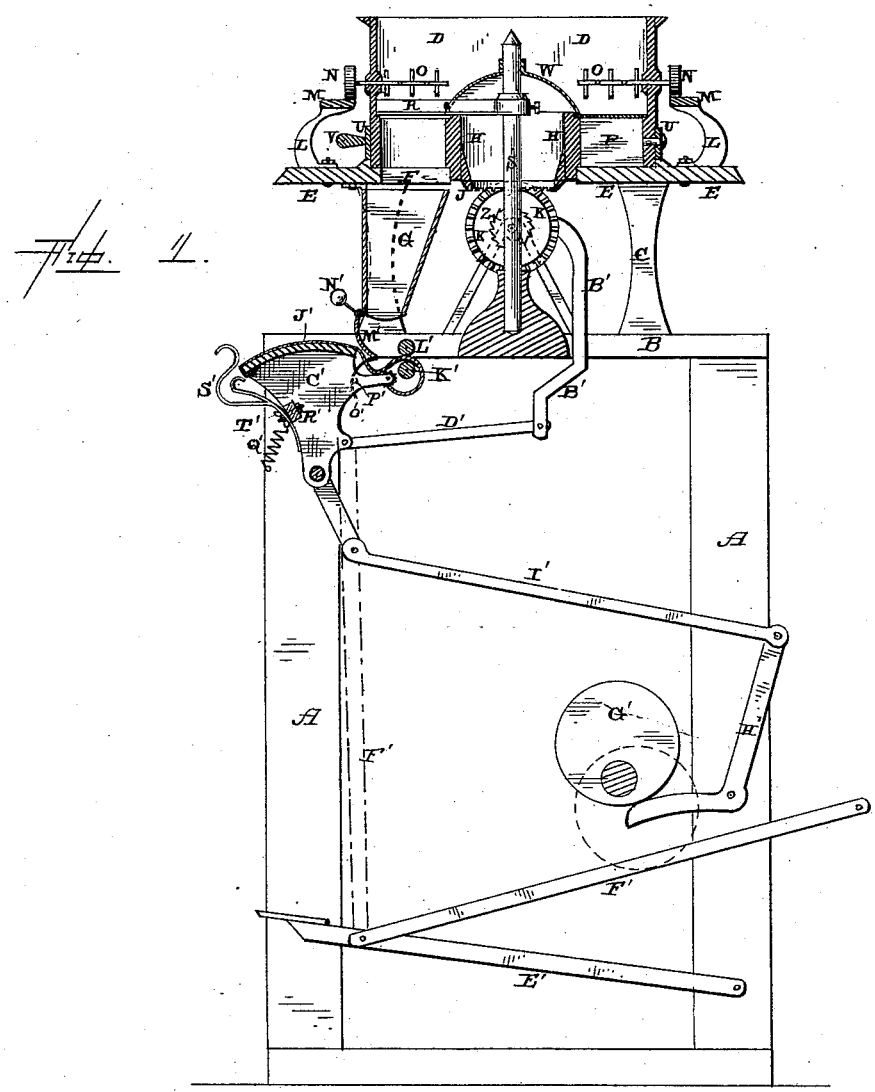

(No Model.) 3 Sheets—Sheet 1.
F. C. SMALSTIG.
CIGAR BUNCHING MACHINE.

No. 359,473. Patented Mar. 15, 1887.

(No Model.) 3 Sheets—Sheet 2.
F. C. SMALSTIG.
CIGAR BUNCHING MACHINE.
No. 359,473. Patented Mar. 15, 1887.
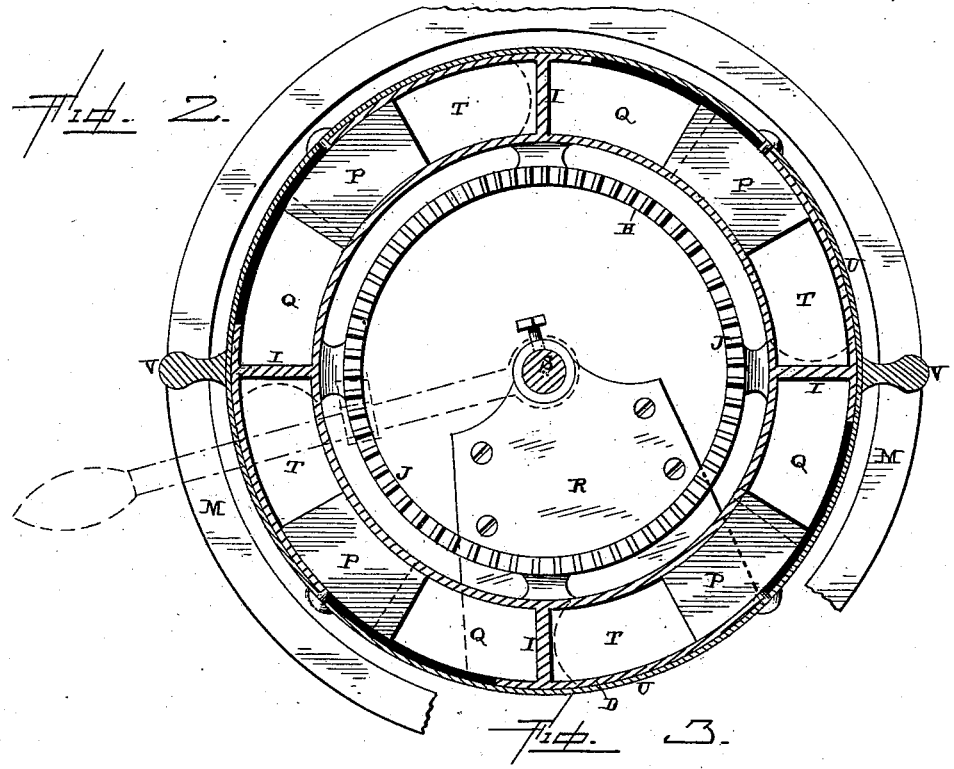
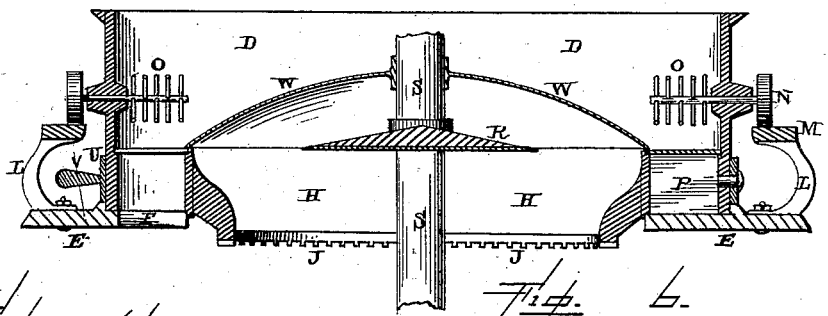
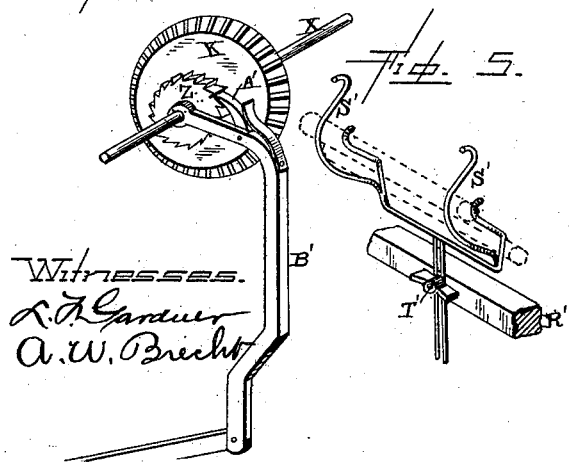
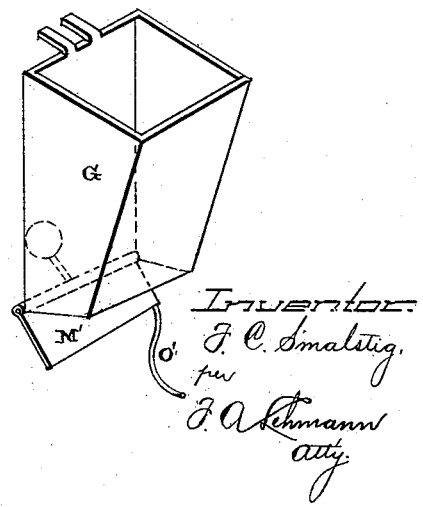
Witnesses.
L. H. Gardner
A. W. Brecht
Inventor:
F. C. Smalstig,
per
F. A. Lehmann
atty.
N. PETERS. Photo-Lithographer, Washington, D. C.

(No Model.) 3 Sheets—Sheet 3.
F. C. SMALSTIG.
CIGAR BUNCHING MACHINE.
No. 359,473. Patented Mar. 15, 1887.
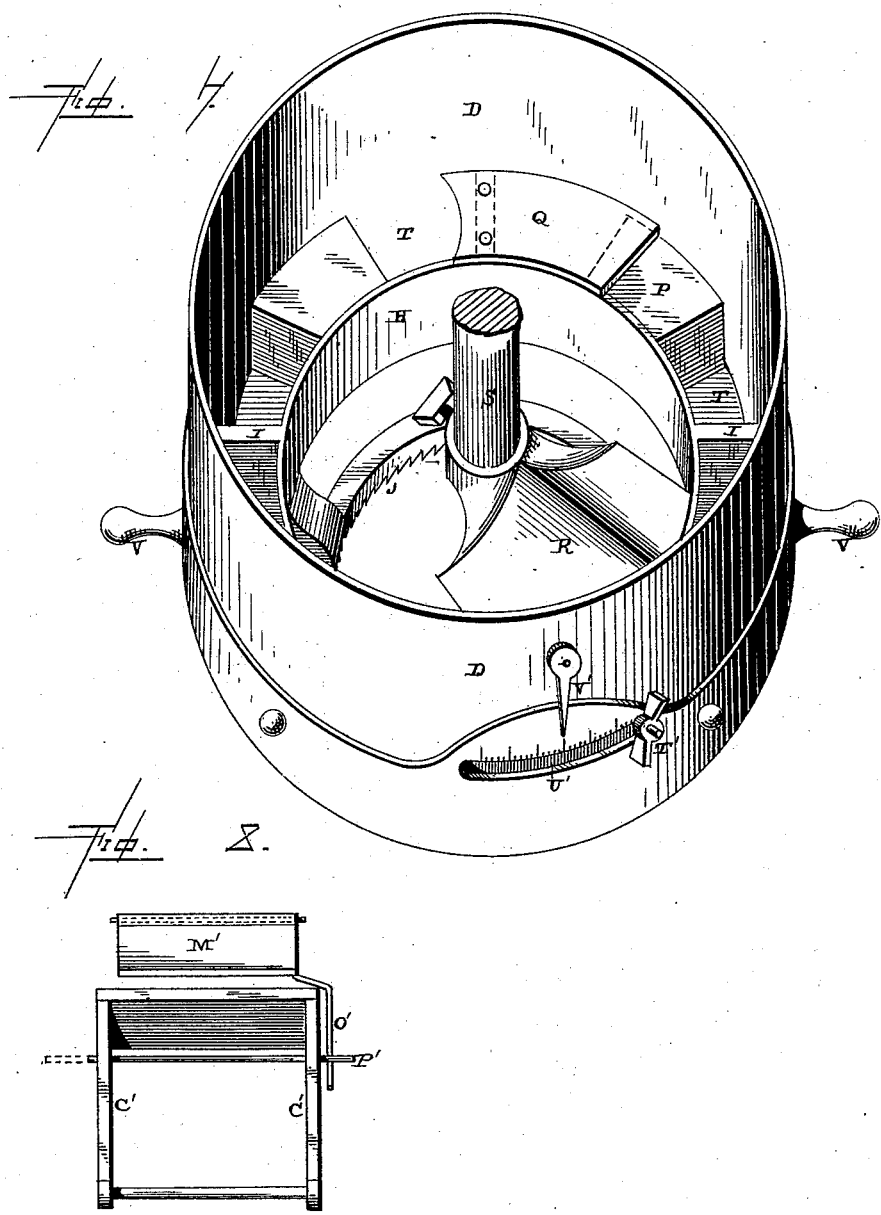

UNITED STATES PATENT OFFICE.

FREDRICK C. SMALSTIG, OF ALLEGHENY CITY, PENNSYLVANIA.

CIGAR-BUNCHING MACHINE.

SPECIFICATION forming part of Letters Patent No. 359,473, dated March 15, 1887.

Application filed December 15, 1886. Serial No. 221,668. (No model.)

*To all whom it may concern:*

Be it known that I, FREDRICK C. SMALSTIG, of Allegheny City, in the county of Allegheny and State of Pennsylvania, have invented certain new and useful Improvements in Cigar-Bunching Machines; and I do hereby declare the following to be a full, clear, and exact description of the invention, such as will enable others skilled in the art to which it pertains to make and use it, reference being had to the accompanying drawings, which form part of this specification.

My invention relates to an improvement in cigar-bunching machines; and it consists in, first, the combination of a revolving hopper and a support therefor with a mechanism for causing the hopper to revolve, a chute, the head, a mechanism for operating the head, the apron, and the rollers between which the apron passes; second, the combination of the revolving hopper, a suitable support therefor, a mechanism for causing the hopper to revolve, the chute, the head, a mechanism for operating it, the apron, and the guiding-rollers, with the stirrers, and a means for causing them to revolve while the hopper is in motion; third, the combination of the revolving bottomless hopper, a suitable support therefor, a mechanism for causing the hopper to revolve, the inner wall, and the partitions which connect the inner and outer walls of the hopper together, with the cut-off, a support therefor, and the knives; fourth, the combination of the revolving bottomless hopper, provided with an inner wall and the connecting partitions, forming chambers, a mechanism for causing the hopper to revolve, the stationary cut-off, a suitable support therefor, the knives, and the adjustable gage-blocks placed in the chambers; fifth, the combination of the revolving bottomless hopper, a suitable support therefor, a mechanism for causing the hopper to revolve, partitions for forming chambers, the inner wall, the stationary cut-off, a support therefor, the knives, the adjustable gage-blocks, and a means for connecting the blocks together, whereby all the blocks are moved at the same time; sixth, the combination of the revolving bottomless hopper, a mechanism for causing it to revolve, a support for the hopper, the partitions for forming chambers, the inner wall, the rod, the dome, the stationary cut-off, and the knives connected to the partitions; seventh, the combination of the revolving bottomless hopper, a suitable support therefor, a mechanism for causing the hopper to revolve, the stirrers provided with wheels, and the circular surface surrounding the hopper; eighth, in a cigar-bunching machine, the combination of the revolving slotted bottomless hopper, a mechanism for causing it to revolve, the inner wall, the partitions, the knives connected to the partitions, the movable gage-blocks, an adjusting-ring connected to the blocks, a clamp for locking the ring in position, the stationary cut-off, and the rod; ninth, the combination of the head, an operating mechanism therefor, the connecting-rod, the lever carrying a dog at its upper end, and the driving-shaft provided with a ratchet and a gear-wheel, with the revolving hopper, which is moved by the gear-wheel, and a suitable support for the hopper; tenth, the combination of the hopper, a chute leading therefrom, an automatically-closing bottom for the chute, the head, a mechanism for operating it, the apron, and the rollers between which the apron passes; eleventh, the combination of the hopper, a support therefor, the chute provided with a hinged automatically-closing bottom, the rod connected to the bottom, the head, a mechanism for operating it, a rod or projection connected to the head for engaging with the rod on the bottom, the apron, and the rollers between which it passes; twelfth, the combination of the head, and a mechanism for operating it, with a bunch-receiver having two sets of spring-arms; and thirteenth, the combination of the head and the mechanism for operating it with a bunch-receiver provided with two sets of spring-arms for clamping the ends of the bunch, and which is made vertically adjustable in relation to the edge of the head.

The objects of my invention are to use a revolving hopper in contradistinction to a stationary one, and which is made to move when operated automatically only while the head is moving forward; to place the stirrers directly over the pockets or chambers, so as to agitate the tobacco just at those points where the agitation is needed; to operate the stirrers without any connecting mechanism whatever; to provide each pocket or chamber with a gage-block, whereby the quantity of tobacco discharged into each wrapper is accurately measured; to connect all of the gage-blocks together, so that they are operated simultaneously; to provide the chute with a bottom which automatically closes, so as to catch the tobacco which has been discharged from the hopper and hold it until the wrapper is ready to receive its charge; to so arrange the operating parts that this automatic closing bottom can be operated either automatically or by the oscillating head, or by hand; to attach to the head a bunch-receiver which will clasp the bunches at their ends and hold them so that the wrappers cannot become loose; and to so arrange and combine the operating parts that when the treadle or other operating device is moved all of the parts in the whole machine are operated, and thus a treadle-motion is made as automatic in its operation as any machine driven by power.

Figure 1 is a vertical section of a machine to which my invention is applied. Fig. 2 is an inverted view of the feeding devices. Fig. 3 is an enlarged vertical section of the hopper, taken at right angles to what is shown in Fig. 1. Fig. 4 is a detail of the mechanism for causing the hopper to revolve. Fig. 5 is an enlarged detail view of the devices for catching and holding the finished bunches. Fig. 6 is a perspective of the chute and its hinged bottom. Fig. 7 is a detail perspective showing the revolving hopper and the parts connected thereto. Fig. 8 is a side elevation of the head and the bottom of the chute.

A represents the frame, of any desired construction, and which is provided with the top B, which has a suitable opening or openings through it, as shown in Fig. 1, to allow the different parts to operate through them. Rising from this top are two or more supports or standards, C, which form a support for the revolving hopper D and the other parts connected therewith. The hopper D is annular in form, as shown, and has its bottom formed by the annular ring E, which is secured rigidly upon the tops of the standards C. This ring E has an opening, F, through it upon one side, where the tobacco drops through from the hopper D into the chute G below. The hopper D is cast or made in a single piece with the inner wall, H, and the radial partitions I. (Shown in Fig. 2.) These partitions I serve to regulate the amounts of tobacco which are to be dropped successively into the chute G, and the inner wall, H, serves not only as the inner sides of the four compartments, but is provided with suitable teeth or gears, J, at its lower edge, so as to mesh with the driving-wheel K, which causes the hopper D to revolve.

Rising from the top or outer edges of the ring E are the standards L, which support a circular friction-disk, M, with which the friction-wheels N, connected to the stirrers O, engage. The stirrers O, one for each compartment, have their shafts journaled through the sides of the hopper D and have the wheels N secured to their outer ends, as shown. The disk M may either be smooth, rough, or provided with teeth, as may be desired, the wheels in any case being made to correspond. As the hopper D is made to revolve, the wheels N are made to move around over the stationary disk M, and thus the stirrers O are set in motion and are operated only while the hopper D is in motion.

In each one of the four compartments into which the bottom of the hopper is formed is placed a gage-block, P, and these blocks are made adjustable endwise, so as to regulate the amount of tobacco which the compartments shall hold. Secured to each one of the partition-walls I is a knife or cut-off, which projects forward a suitable distance and which forms the top of the rear part of the chamber, so as to prevent the tobacco from falling into the chamber in the rear of the block P. This knife Q serves as a cut-off when the hopper in revolving brings each knife successively under the cut-off R, which is secured to the stationary rod S. This cut-off R projects across the bottom of the hopper and the tops of the chambers, as shown in Figs. 1 and 2, and serves to prevent any tobacco from dropping from the hopper through the opening F into the chute G, except that which is in each one of the compartments. This cut-off R is beveled upon its top, as shown in Figs. 3 and 7, so that the tobacco will not lodge thereon, and its edges are made sharp, so as to act in connection with the knives Q, and thus cut off the supply of tobacco as each chamber passes successively under it. The knives Q form chambers, into which the blocks P can be moved for the purpose of increasing the size of the chambers T, in which the tobacco that is to be dropped into the chute G is held. In proportion as the block P is moved out from under the knife Q, so the chamber T is decreased in size, and the smaller the amounts of tobacco are which are discharged through the opening F into the chute G.

In order to make the adjustment of each one of the blocks P exactly the same, the ring U, provided with a handle, V, is placed outside of the hopper, and this ring U is connected through suitable slots in the side of the hopper by means of suitable bolts or screws with the blocks P. By moving this ring U, the blocks P are to be adjusted at the same time and moved the same distance, thus keeping the chambers T one exact size.

Should it be so desired, the ring U and the blocks P may be cast in a single piece, in which case openings or recesses will be made in the bottom of the hopper, so that they can be adjusted independently thereof at the will of the operator. These recesses will be made in the bottom edge of the hopper, so as to straddle over the connecting parts between the blocks and the ring, and allow the ring and the blocks to be adjusted, as before described.

When the ring U is moved by its handle V, the blocks P are either moved back into the chambers T, so as to enlarge them, or the blocks P can be moved out of the chambers, so as to decrease their size, as may be desired. After the ring U has been adjusted into the desired position, it is clamped rigidly in place by means of a device, T', as shown in Fig. 7, so as to prevent it from being accidentally moved while the hopper D is revolving. In connection with the ring is a gage, of any suitable kind, just above the slot U', and used in connection with the gage is the pointer V', secured to the hopper, which indicates the amount of tobacco the pockets are gaged for. This gage and pointer indicate to the operator the exact quantity of tobacco which will be discharged through the chute each time the head C' is returned to position. The tobacco in the hopper is prevented from dropping through between the inner walls, H, by means of the dome W, which forms the bottom for this part of the hopper, and which dome W is centered upon the stationary rod S. This rod S is secured rigidly in position in the center of the top B of the frame A, as shown in Fig. 1.

Journaled in suitable bearings is the horizontal shaft X, upon which is placed the driving-wheel K, which meshes with the teeth J on the lower edge of the walls H; also secured to this shaft X is a ratchet-wheel, Z, with which the spring-actuated dog A' engages. This dog is secured to the upper end of the operating-lever B', which projects down through the opening in the top B, and is connected to the head C' by means of the rod D'. Each time that the head C' is forced forward the hopper B' is moved so as to cause the shaft X to turn partially around, and in turning, the hopper D and the stirrers O are both set in motion. Thus it will be seen that while the head C' is moved forward the hopper D and the stirrers are in operation, but at no other time.

The head C' is made of the usual shape, and may be operated either by the treadle E' and the connecting-rod F', or it may be operated by the revolving cam G', driven by power, and the angular lever H' and the lever I', as may be desired. The apron J' passes over the head in between the stationary roller K' and the friction-roller L', as shown. The slack of the apron between the front edge of the head and the rollers form the pocket, into which the tobacco is caught as it drops from the chute G. To the lower end of the chute G is secured the hinged bottom M', which is provided with a counter-weight, N', so as to cause the bottom to automatically close whenever it is left free to move, and thus prevent the tobacco from dropping until the pocket is formed ready to receive it. In order to operate this bottom M' and cause it to discharge tobacco just at the proper time, this bottom M' is provided with a curved rod, O', at one corner, and which rod O' is struck by the projecting end of the rod P', which passes through the head C' and which is movable endwise. When this rod P' is moved so that its end projects a certain distance beyond the end of the head C', as shown in Fig. 8, the rod O' is struck as the head moves back, and the bottom is operated just in time to discharge the tobacco from the chute G into the pocket. As the head C' is moved forward the rod P' releases the rod O', and then the weight N' closes the bottom M', so as to catch the tobacco which is being discharged into the chute.

When the rod P' is moved endwise, as shown by dotted lines in Fig. 8, the rod O' is not operated thereby, and then the bottom must be operated entirely by hand. This occurs where the tobacco is more or less spoiled from too much moisture, when a reduction in speed of the machine becomes necessary in order to place the wrappers in position. When the tobacco is moist it cannot be worked as readily as when dry, and for this reason a slower speed of the machine becomes necessary, and then the bottom of the chute can be operated by hand, so as to only discharge the tobacco when the pocket is ready to receive it. Secured to the rear edge of the head C' is a spring, Q', which serves to return the head C' to position when left free to move.

Securely fastened to the cross-piece R', which extends across the head C', is the bunch-holder S', which is shaped as shown in Figs. 1 and 5 and which is made vertically adjustable upon the bar R', and in relation to the rear edge of the head C', by the set-screw T'. This bunch-holder consists of four spring-arms, as shown, and as the bunch is forced from the rear edge of the head by the apron it is caught between the two sides of the curved spring-arms, as shown in Fig. 5, where it is securely held until the bunch-holder, with all of its bunches, is removed by hand, to be replaced by another bunch-holder. By having the bunch-holders catch the bunches and hold them, the wrapper is prevented from becoming loose upon the filling, as it is always liable to do when the bunch is discharged from the holder. As fast as one bunch-holder becomes filled it is removed from the cross-bar T' and replaced by another. Each bunch-holder is made vertically adjustable, so that it will be in just the proper position to receive the bunch from time to time. Each bunch-holder is formed of two spring-arms, as here shown, so as to catch the bunches at the ends where the lap of the wrapper begins and ends, and then the wrapper can never become loose or the bunches lose any of their filling at the ends.

In case it should be desired to make the chambers T of one uniform size, the adjustable gage-blocks and the ring for adjusting them would of course be entirely dispensed with. The knives Q would then simply act as cut-offs without forming chambers for the blocks to move into. In case the gage-blocks were done away with in a construction such as here shown, it would be necessary to close all of the slots in the sides of the hopper, so as to prevent the tobacco from escaping through them.

A movable head, C', of ordinary construction, is here shown in connection with the parts which form my invention; but it is evident that the ordinary roller-machine may be used as a substitute for the head. Either the head C' or the ordinary roller-machine may be used, just as may be preferred.

The movable head, as here shown, is connected to the operating mechanism for causing the hopper to revolve; but, should it be desired, a crank may be applied to the end of the operating-shaft, in which case the hopper would be moved by hand just as the head or rollers were forced forward, the only difference in operation being that the hopper would then be moved by hand instead of by the head or roller. The crank or lever will only be used where it is desired to apply this revolving hopper to a hand-feeding machine. In Fig. 2 in dotted lines is shown a lever by means of which the hopper can be made to revolve by hand. The lever is provided with a dog which engages with the teeth J, and has its outer end projecting out beyond the hopper, so as to be readily moved by hand.

Having thus described my invention, I claim—

1. In a cigar-bunching machine, a revolving hopper, D, and a support, E, therefor, in combination with a mechanism, substantially as shown, for causing the hopper to revolve, a chute, G, the head C', a mechanism for operating the head, the apron J', and the rollers K' L', between which the apron passes, substantially as shown.

2. In a cigar-bunching machine, the combination of the revolving hopper D, a suitable support, E, therefor, a mechanism for causing the hopper to revolve, the chute G, the head C', a mechanism for operating it, the apron, and the guiding-rollers, with the stirrers O and a means, substantially as shown, for causing the stirrers to revolve while the hopper is in motion, substantially as described.

3. In a cigar-bunching machine, the combination of the revolving bottomless hopper, a suitable support therefor, a mechanism for causing the hopper to revolve, the inner wall, H, and the partitions I, which connect the inner and outer walls of the hopper together, with the cut-off, a support therefor, and the knives Q, substantially as set forth.

4. In a cigar-bunching machine, the combination of the revolving bottomless hopper provided with an inner wall and the connecting partitions forming chambers, a mechanism for causing the hopper to revolve, the stationary cut-off, a suitable support therefor, the knives Q, and the adjustable gage-blocks placed in the chambers, substantially as specified.

5. In a cigar-bunching machine, the combination of the revolving bottomless hopper, a suitable support therefor, a mechanism for causing the hopper to revolve, partitions for forming chambers, the inner wall, H, the stationary cut-off, a support therefor, the knives Q, the adjustable gage-blocks, and a means for connecting the blocks together, substantially as shown, whereby all the blocks are moved at the same time.

6. In a cigar-bunching machine, the combination of the revolving bottomless hopper, a mechanism for causing it to revolve, a support for the hopper, the partitions for forming chambers, the inner wall, H, the rod S, the dome, the stationary cut-off, and the knives Q, connected to the partitions, substantially as described.

7. In a cigar-bunching machine, the combination of the revolving bottomless hopper, a suitable support therefor, a mechanism for causing the hopper to revolve, the stirrers O, provided with wheels N, and the circular surface M, surrounding the hopper, substantially as set forth.

8. In a cigar-bunching machine, the combination of the revolving slotted bottomless hopper, a mechanism for causing it to revolve, the inner wall, H, the partitions, the knives connected to the partitions, the movable gage-blocks, an adjusting-ring connected to the blocks, a clamp for locking the ring in position, the stationary cut-off, and the rods S, substantially as specified.

9. The combination of the head C', an operating mechanism therefor, the connecting-rod D', the lever B', carrying a dog at its upper end, and the driving-shaft provided with a ratchet and a gear-wheel, with the revolving hopper, which is moved by the gear-wheel, and a suitable support for the hopper, substantially as shown.

10. In a cigar-bunching machine, the combination of the hopper, a chute leading therefrom, an automatically-closing bottom for the chute, the head, a mechanism for operating it, the apron, and the rollers between which the apron passes, substantially as described.

11. In a cigar-bunching machine, the combination of the hopper, a support therefor, the chute provided with a hinged automatically-closing bottom, the rods O', the head, a mechanism for operating it, a rod or projection connected to the head for engaging with the rod O' on the bottom, the apron, and the rollers between which it passes, substantially as set forth.

12. In a cigar-bunching machine, the combination of the head and a mechanism for operating it with a bunch-receiver having two sets of spring-arms, substantially as specified.

13. In a cigar-bunching machine, the combination of the head and a mechanism for operating it with a bunch-receiver provided with two sets of spring-arms for clamping the ends of the bunch, and which is made vertically adjustable in relation to the edge of the head, the arms being arranged substantially as shown.

In testimony whereof I affix my signature in presence of two witnesses.

FREDRICK C. SMALSTIG.

Witnesses:
B. F. MORSELL,
L. L. BURKET.